(12) United States Patent
Borzym (10) Patent No.: US 6,698,322 B2
(45) Date of Patent: Mar. 2, 2004

(54) SUPPORTED SHEAR WITH REVERSIBLE DRIVE AND METHOD OF OPERATING SAME

(76) Inventor: John J. Borzym, 888 Andover, Northville, MI (US) 48167

( * ) Notice: Subject to any disclaimer, the term of this patent is extended or adjusted under 35 U.S.C. 154(b) by 0 days.

(21) Appl. No.: 10/266,055

(22) Filed: Oct. 8, 2002

(65) Prior Publication Data

US 2003/0150307 A1 Aug. 14, 2003

Related U.S. Application Data

(62) Division of application No. 09/633,386, filed on Aug. 7, 2000, which is a division of application No. 08/941,811, filed on Sep. 30, 1997, now Pat. No. 6,352,012.

(51) Int. Cl.[7] .............................................. B26D 3/00
(52) U.S. Cl. .............................. 83/54; 83/628; 83/630; 83/633
(58) Field of Search .................... 83/319, 320, 382, 83/285, 632, 700, 54, 42, 189, 628, 630, 633, 318, 862, 183, 196, 401, 178–182, 184–188, 190–195, 37, 38, 219, 220

(56) References Cited

U.S. PATENT DOCUMENTS

| | | |
|---|---|---|
| 3,661,050 A | 5/1972 | Erikson |
| 3,698,269 A | 10/1972 | Mercer, Jr. |
| 4,030,585 A | 6/1977 | Ducanis |
| 4,358,977 A * | 11/1982 | Brandli ........................ 83/319 |
| 4,376,401 A * | 3/1983 | Borzym ....................... 83/319 |
| 4,553,460 A | 11/1985 | Stahl et al. |
| 4,609,070 A | 9/1986 | Porps et al. |
| 4,631,998 A | 12/1986 | Borzym |
| 4,635,514 A | 1/1987 | Borzym |
| 4,769,889 A | 9/1988 | Landman et al. |
| 4,794,834 A * | 1/1989 | Werner ........................ 81/185 |
| 4,964,325 A * | 10/1990 | Hartmann et al. ............ 83/321 |
| 5,052,608 A | 10/1991 | McClure |
| 5,076,125 A * | 12/1991 | Riera et al. ................... 83/285 |
| 5,195,408 A | 3/1993 | Niehaus |
| 5,535,653 A | 7/1996 | Berns et al. |
| 5,690,011 A * | 11/1997 | Hill et al. ..................... 83/319 |
| 5,744,778 A | 4/1998 | Kash et al. |
| 6,123,003 A * | 9/2000 | Borzym ........................ 83/54 |
| 6,352,012 B1 | 3/2002 | Borzym et al. |

FOREIGN PATENT DOCUMENTS

DE   19925826 A1   6/1996

* cited by examiner

Primary Examiner—M. Rachuba
(74) Attorney, Agent, or Firm—Young & Basile P.C.

(57) ABSTRACT

A reversible linear hydraulic drive system for a bidirectional supported shear having an adjustable stroke length. A method for improving the quality of the tube ends after shearing using a reversible partial orbital path is also disclosed.

3 Claims, 9 Drawing Sheets

SUPPORTED SHEAR WITH REVERSIBLE DRIVE AND METHOD OF OPERATING SAME

This application is a divisional application as to non elected claims in co-pending application Ser. No. 09/633,386, filed Aug. 7, 2000, as well as a continuation-in-part as to the same subject matter. The aforesaid Ser. No. 09/633,386 is a divisional application of U.S. application Ser. No. 08/941,811 filed Sep. 30, 1997, now U.S. Pat. No. 6,352,012 and claims priority to the filing date of said application/patent except as to the newly added subject matter.

FIELD OF THE INVENTION

This invention relates to bladeless shearing of linear stock such as steel tubing and, more particularly, to a supported shear apparatus having a reversible drive and to a method of operating same to improve the quality of the newly created stock ends at each parting plane.

BACKGROUND OF THE INVENTION

In U.S. Pat. No. 4,635,514 "Elliptical Shearing Apparatus", issued Jan. 13, 1987 to Alexander Borzym, there is disclosed a bladeless device for shearing linear stock, such as bar stock and tubing, by causing a section of the stock to translate laterally through an elliptical shaped orbital path relative to the axially adjacent stock. As is more fully disclosed in the aforesaid patent, this is achieved through the use of a first body referred to as a "die holder" having a central, die-like aperture formed therein which is adapted to receive and precisely surround the linear stock. One side of the die holder is pinned to permit pivotal and limited lateral motion. The other side is connected to a drive mechanism consisting of a large electric motor driving a flywheel at constant speed and a clutch and brake mechanism for selectively and momentarily imparting orbital motion to the die holder. Orbital motion of the die holder around the mechanical drive center produces a unidirectional, elliptical translation of the stock receiving die which lies between the drive center and the pinned end of the die holder. The amplitude of the elliptical motion is a function of the amplitude of the orbital drive motion and the geometric location of the die within the die holder body.

By placing a fixed die also having a stock-receiving aperture immediately axially adjacent to the moveable die, a scissors-like shearing action is produced on a length of stock which is inserted through the two aligned dies; the shear line is defined by the mating plane of the two dies. Deformation of tubular stock is prevented by placing a special mandrel in the stock in the area of the shear plane.

There are numerous advantages to a shear of this type relative to cutoffs using blades or other cutting implements. The principal advantages are the elimination of the cutting implement as a perishable component and the conservation of material in the work piece; i.e., saw blades and guillotine blades remove a section of material approximately equal to the thickness of the blade each time it passes through the stock. The resulting loss of material from the stock is significant, particularly where short lengths and high cutting rates are employed.

SUMMARY OF THE INVENTION

A first aspect of my invention is the provision of an improved drive for the orbital die, which drive eliminates the need for the clutch and brake of the '514 patent. In general, my improved drive comprises an hydraulic power source for moving the orbital die in opposite directions. Preferably, the power source comprises two separate hydraulic cylinders connected to respective linear racks engaging the opposite sides of a pinion connected to displace the orbital die.

A second aspect of my invention includes a method of shearing tubular stock by (a) setting the stroke to approximately the wall thickness of the stock, (b) orbitally displacing the moveable die 270 degrees from a home position, and (c) orbitally displacing the moveable die back to the home position.

These and other advantages of the invention will be best understood by reading the following specification which described an illustrative embodiment of the invention in detail.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

General

Figure 1:
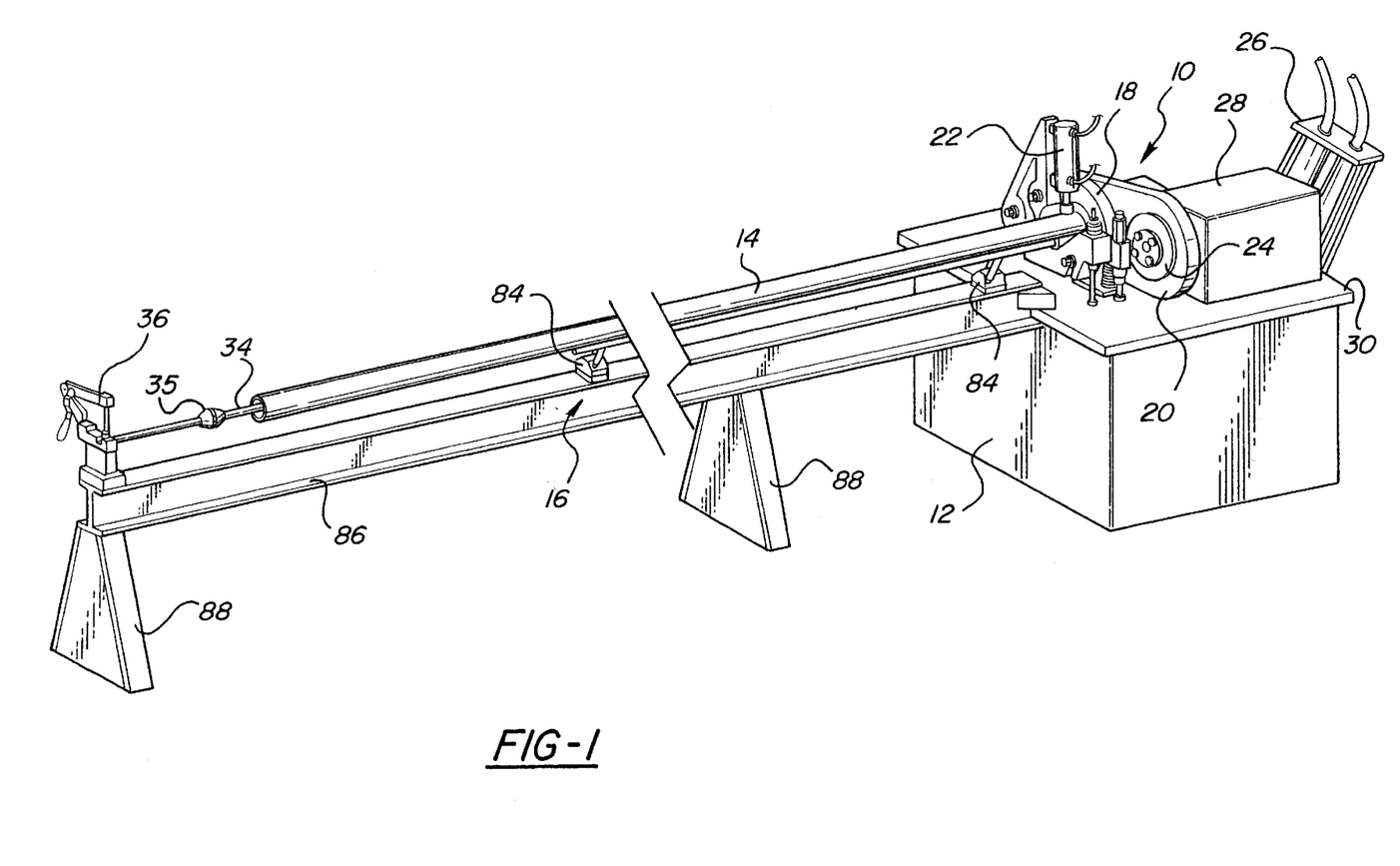
FIG. 1 is a perspective view of a bladeless shear device having an in-feed table which feeds tubing onto a mandrel rod and into the shear from left to right.
Figure 3:
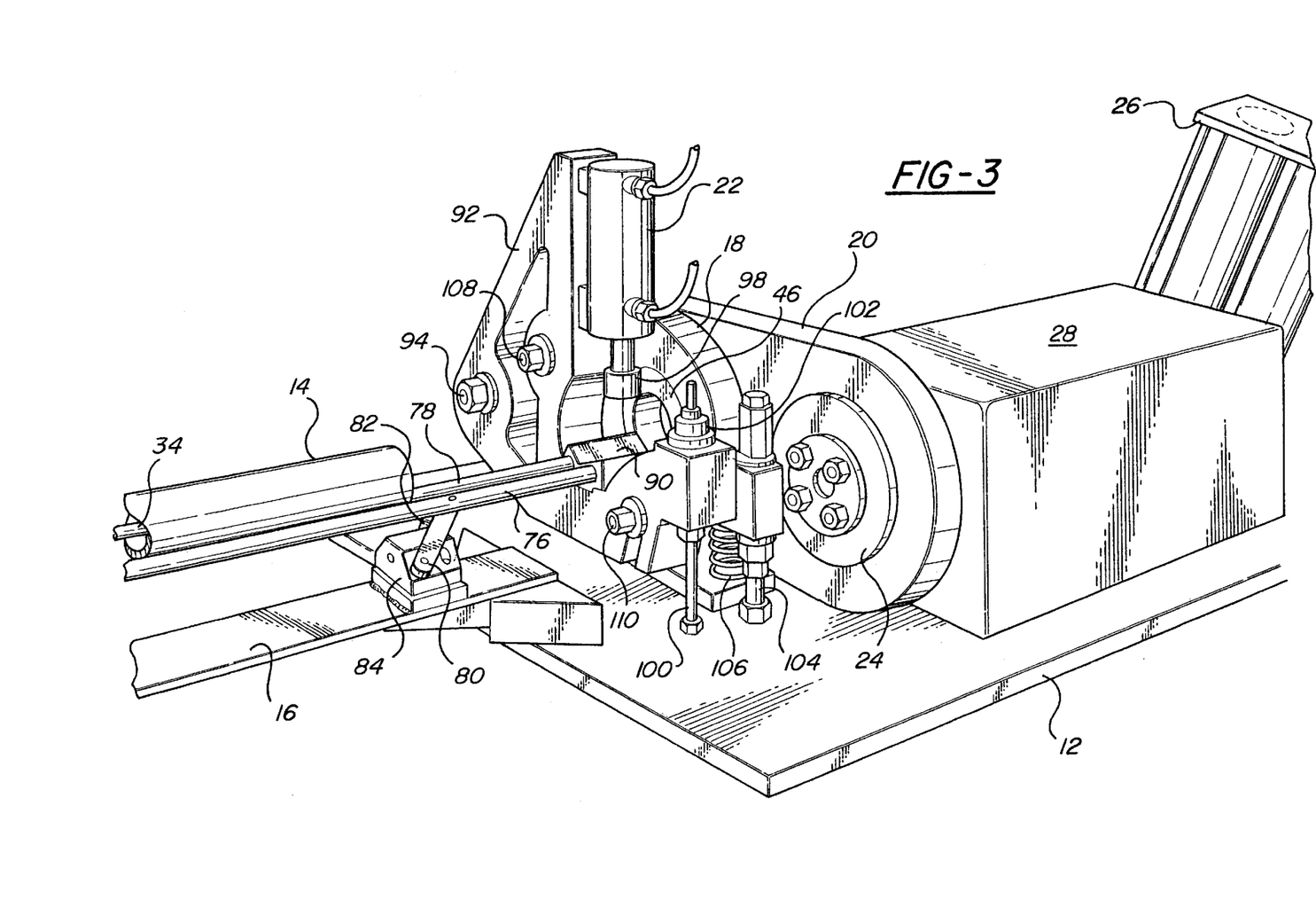
FIG. 3 is a perspective drawing of the bladeless shear device of FIG. 1 enlarged to show detail.

Referring to FIGS. 1 and 3, there is shown a bladeless supported shear device 10 mounted on a rigid steel base 12 for shearing tubular stock 14 which is fed into the device 10 with the help of an in-feed table 16 which underlies and supports the stock. Device 10 comprises a die holder assembly including a stationary ram 18, an axially adjacent orbital ram 20 and a stock clamp 22. The orbital ram 20 comprises a drive wheel 24 which is variably eccentrically driven by an hydraulic linear actuator assembly 26 through a drive shaft housing 28. Base 12 includes a generally planar top 30 of convenient work height for the device 10 which is matched to the height of the in-feed table 16.

The device 10 of FIGS. 1 and 3 can be applied to the shearing of tubular stock made of any of a variety of materials ranging from relatively soft materials to relatively hard, low ductility materials such as stainless steel. While the basic device 10 can be used to shear a wide variety of shapes including both solid or bar stock, the illustrative embodiment hereinafter described is used to shear tubular stock of about 2"–4" in diameter and with wall thicknesses of less than about 1".

The apparatus of FIG. 1 includes a mandrel 32 (see FIG. 6) which is inserted into the stock 14 from the end most distal from the device 10 by way of a small diameter rod 34 of adjustable length and which is adapted to be held in position during a shearing operation by means of a manually releasable clamp 36 carried on the end of in-feed table 16. The construction of operation of the device 10 and table 16 will be described on the premise that the stock 14 is being re-cut to lengths, constant or variable, which are selected fractions of the original stock length in preparation for a fabrication operation utilizing the re-cut lengths. It is further premised that the stock 14 is being intermittently fed into the ram assembly of the device 10 and that actuation of the ram assembly to produce the shearing action occurs while the stock 14 is stationary. A suitable systems for automatically feeding stock into the shear device 10 is described in copending application Ser. No. 09/633,721, copending herewith.

Figure 2:
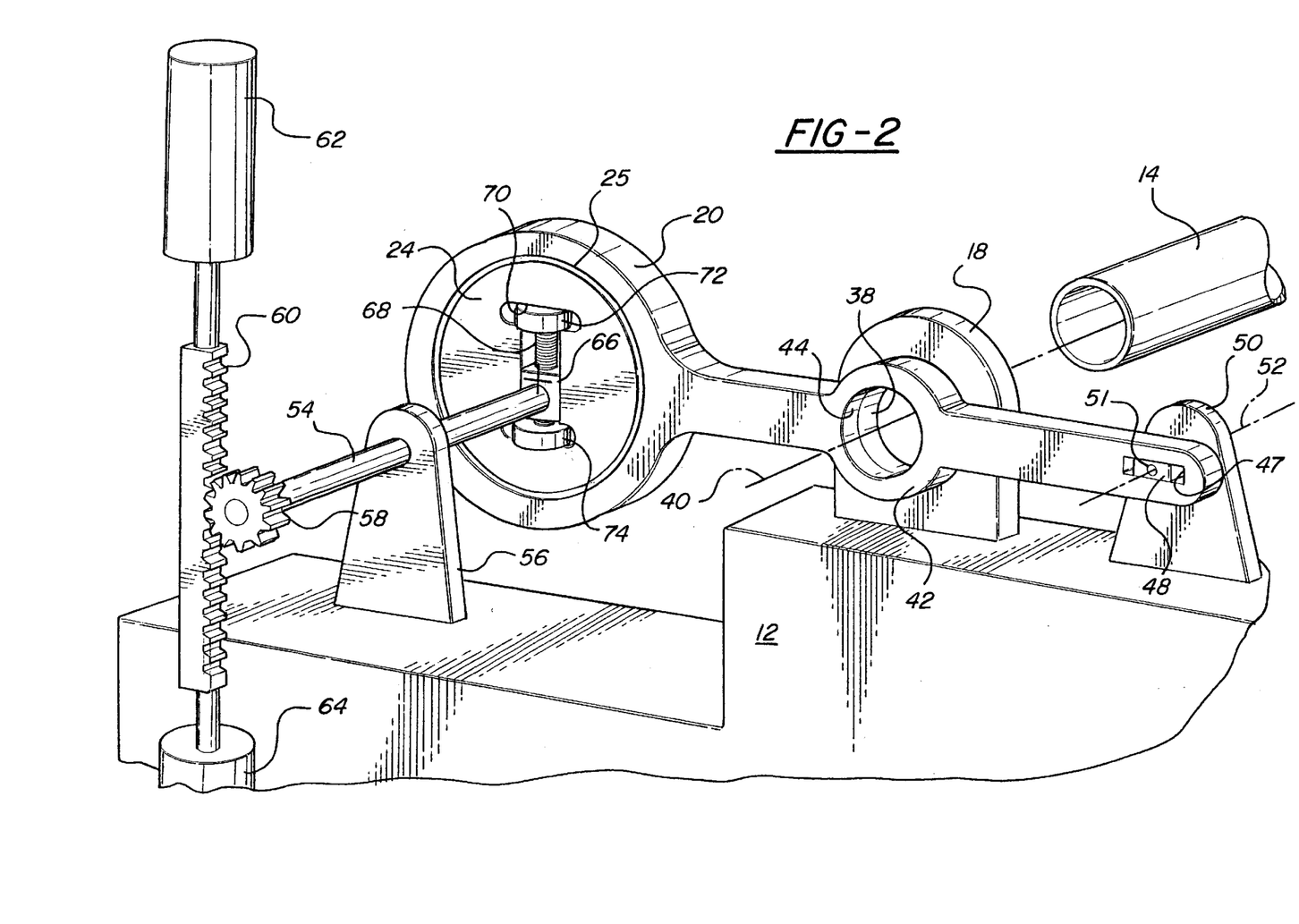
FIG. 2 is a simplified schematic drawing of an adjustable stroke tube shear and linear motor drive useful in explaining the concept of the present invention.
Figure 7:
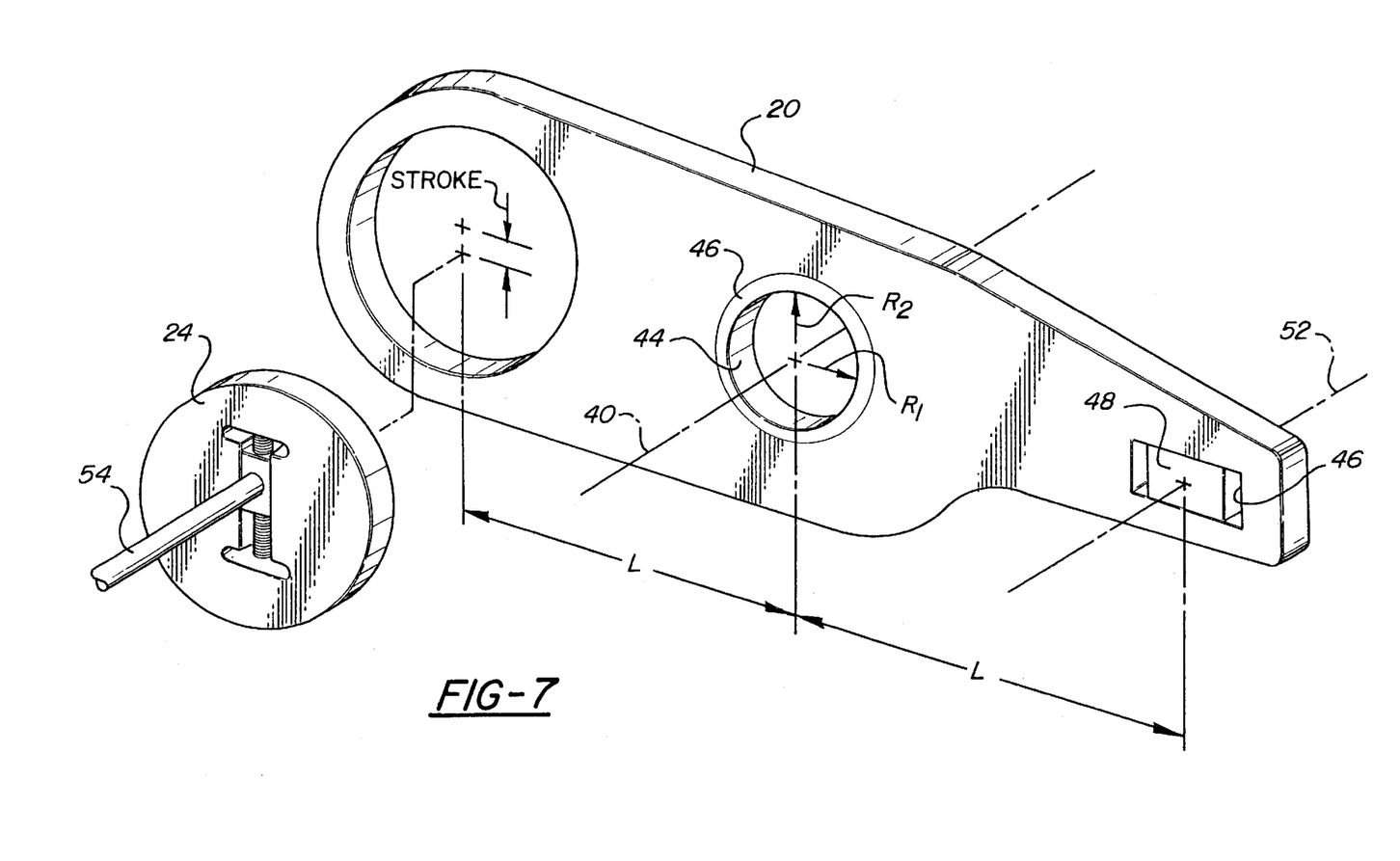
FIG. 7 is a simplified view of the orbital ram and a portion of the drive system useful in explaining certain dimensional relationships of the orbital drive function.

Referring now to FIGS. 2 and 7, a brief description will be made of the principal components of the bladeless shearing device 10 including the linear drive 24, 26, 28 and the functions thereof in shearing the stainless steel tubular stock 14. It will be understood that a mandrel is not needed if the stock is of an open shape or configuration which can be matched by die openings in the die holder assembly 18, 20.

Figure 4:
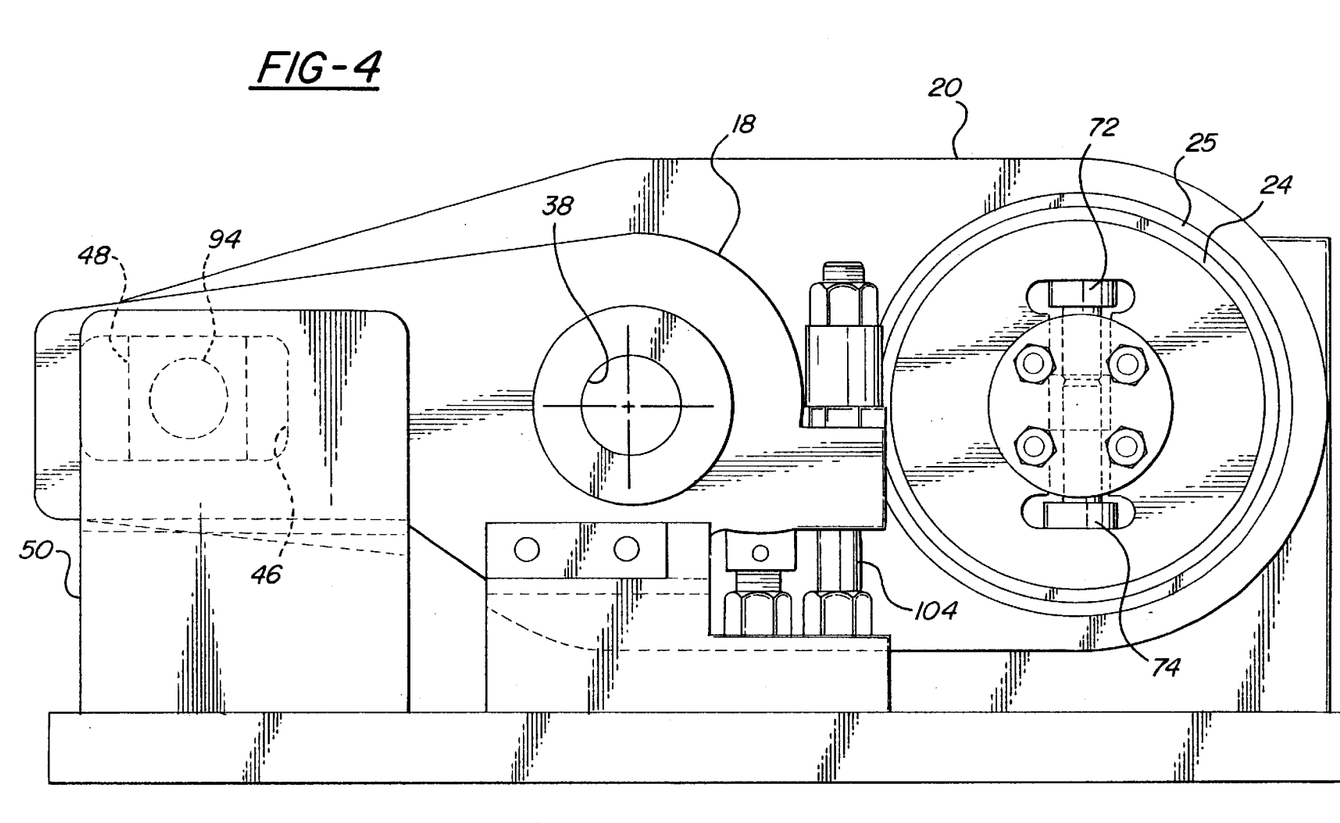
FIG. 4 is a front view of the bladeless shear machine illustrating the arrangement of the stationary and orbital rams and the adjustable orbital drive.

As shown in FIG. 2, the stationary ram 18 is mounted on the base 12 and has a circular die aperture 38 the shape of which conforms closely to the external surface of the stock 14 and the central axis 40 of which is aligned with the longitudinal axis of the stock. Located in abutting, adjacent relationship to the stationary ram 18 is an orbital ram 20 a central portion 42 of which is provided with a circular die aperture 44 which, in the rest position of the ram 20, is axially aligned with the aperture 38 in the stationary ram 18 thereby to receive the tubular stock 14 and permit the stock to pass through the apertures 38 and 44 to the desired extent. The diameter of aperture 44 is slightly larger than that of aperture 38. The actual shape of the orbital ram 20 is more realistically illustrated in FIGS. 3, 4 and 7, the shape of FIG. 2 being chosen merely for purposes of schematic description; i.e., the shape shown in FIG. 7 provides more strength and rigidity which is required of a tube shearing operation in actual practice. Moreover, the ram 20 is shown in FIG. 7 to include a replaceable tool-steel insert 46 which defines the die aperture 44.

The right-hand side of the orbital ram 20, as shown in FIGS. 2 and 7, is provided with a slot 47 which receives in sliding relationship therein a pivot block 48 which is pivotally mounted on a bearing flange 50 by means of a shaft 51 for pivotal motion about an axis 52 which is parallel to the axis 40 of the apertures 38 and 44. Bearing flange 50 is welded to base 12. The lateral clearances between the block 48 and the slot 47 permit limited lateral movement of the ram 20 relative to the flange 50 for reasons to be explained.

At the left end, as seen in FIGS. 2 and 7, the ram 20 fully surrounds and accommodates therein the drive wheel 24 and a bearing 25 therefor. The wheel is rotatably driven through a shaft 54 supported on the machine base 12 by a fixed support 56. Shaft 54 carries a pinion 58 which meshes with the teeth of a vertical rack 60 which is alternately driven in opposite directions by hydraulic cylinders 62 and 64 which are part of the linear actuator assembly 26.

The shaft 54 is assembled to wheel 24 by way of an integral nut 66 which is trapped within a semi-diametral slot 70 in wheel 24. The nut 66 is threaded to receive a screw shaft 68 having upper and lower thumb wheels 72 and 74. Rotation of the shaft 68 causes movement of the nut 66 along the shaft such that the center of shaft 54 can be displaced to any desired degree from the geometric center of the wheel 24, which center is marked in FIG. 2 by a cross symbol. It can readily be seen that when the center of shaft 54, i.e., the wheel "drive center," coincides with the geometric center of the wheel itself, rotation of the wheel causes no motion of the ram 20 relative to base 12. However, when the drive center is displaced from the geometric center of the wheel 24 as shown in both FIGS. 2 and 7, an eccentric drive is created which forces the center of the ram 20 to follow an orbital path around the center line of the shaft 54. This eccentric motion, although orbital about the shaft centerline, is elliptical in the area of ram portion 42 as hereinafter explained.

In the schematic examples of FIGS. 2 and 7, the distance from axis 52 to the center line of shaft 54 where the slot 70 is vertical is twice the distance from the axis 52 to the axis 40. To state it otherwise, the centerline of the tooling die aperture 44 is exactly midway between the center of wheel 24 and the pivot shaft 50. Accordingly, the radial amplitude of the vertical component of displacement of the axis 40 when the eccentric wheel drive is operative is one-half of the radial displacement of the wheel center+from the center of the shaft 54. However, the amplitude of the lateral displacement of the ram 20 in all places is equal to the radial amplitude of the orbital motion about the center of shaft 54, the clearances between the block 48 and slot 46 permit this lateral translation. Since the amplitude R1 of the lateral ram displacement is twice the amplitude R2 of the vertical displacement at axis 40, the motion of the ram 20 about the axis 40 is elliptical rather than circular. The amplitude R1 is called the "stroke" and is varied by varying its degree of drive eccentricity through thumb wheels 72 and 74.

Figure 6:
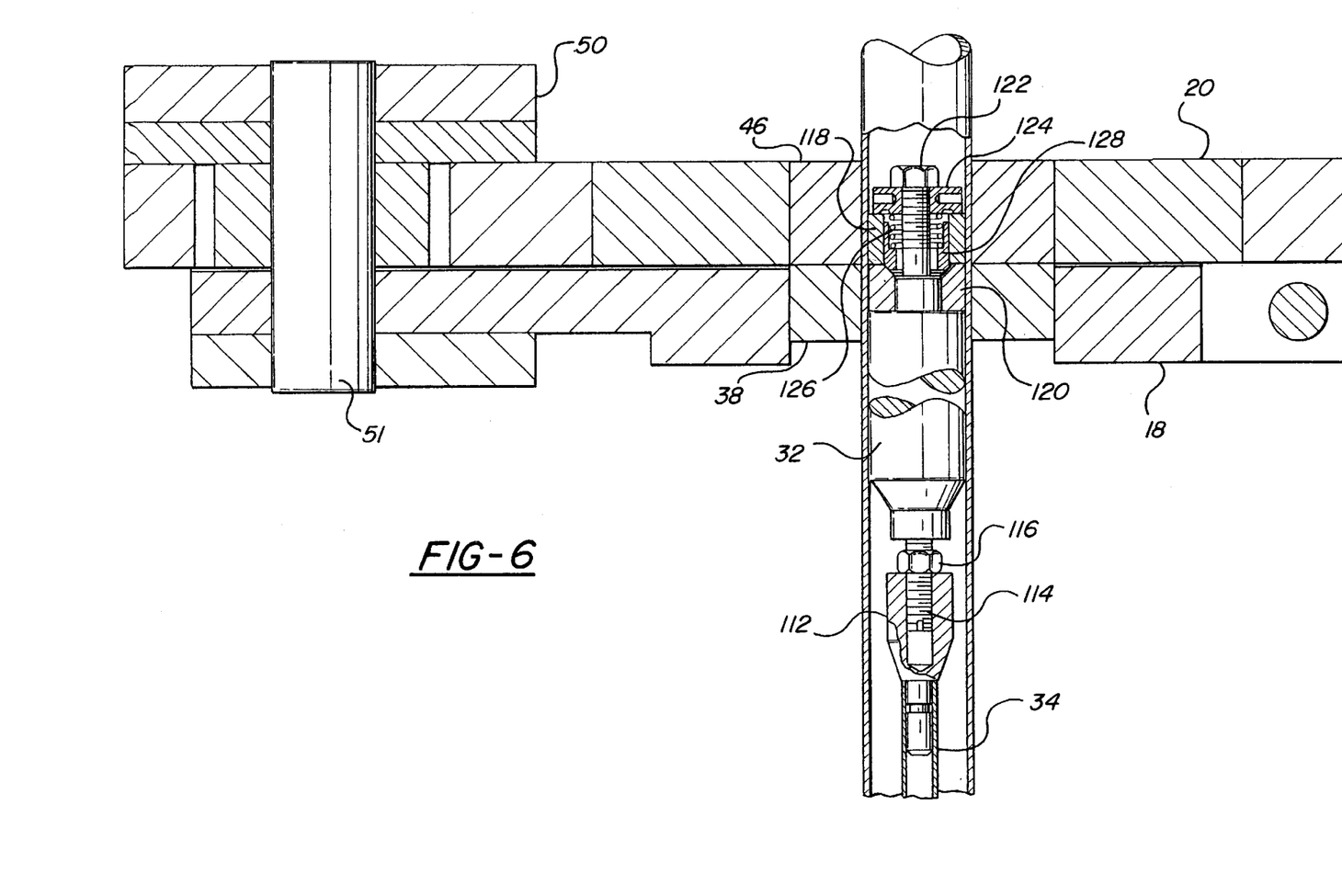
FIG. 6 is a cut away view of the ram and tooling portion of the device of FIG. 1 with the mandrel in place within a length of tubular stock to be sheared.

In operation, the apparatus schematically illustrated in FIG. 2 is set up with the nut 66 displaced from the geometric center of the drive wheel 24 by a distance which is approximately equal to the wall thickness of the tubular stock 14. In addition, the apertures 38 and 44 are arranged so that they are coaxial; in the actual device hereinafter described this requires that the stationary ram 18 be adjustable in vertical position relative to the base 12. The stainless steel tubular stock 14 is fed through the concentric tooling apertures 38 and 44 until the desired shear line of the stock is co-extensive with the plane in which the inner diameters of the apertures 38 and 44 meet; i.e. the circular "seam" between the aperture 38 of the stationary ram 18 and the aperture 44 of the orbital ram 20. A mandrel such as 32 in FIG. 6 is placed within the stock 14. As hereinafter explained, the mandrel plays an integral part in the shearing action.

At this time, one of the hydraulic cylinders 62 and 64 is actuated to displace the rack 60 sufficiently to rotate pinion 58 about one revolution. The orbital motion imparted to the wheel 24 by the eccentric drive produces elliptical movement of the shearing ram 20 relative to the stationary ram 18 and the section of the tubular stock 14 within and forward of the aperture 44 is displaced elliptically relative to the axially adjacent section of tubular stock which is held fixed within the aperture 38 of the stationary ram 18. This relative elliptical motion is sufficient to shear or break the material of the tubular stock 14 cleanly in the plane which is co-extensive with the seam between the apertures 38 and 44. Cleanly shorn tube ends requiring little or no secondary operations are the typical result.

Except when the method hereinafter described is used, the tubular stock is thereafter advanced until the next shearing location is centered between the stationary and fixed rams 18 and 20, respectively, and the opposite cylinder 62, 64 is actuated to drive the wheel 24 via the shaft 54 through one revolution in a direction opposite to that of the first operation. The intermittent bidirectional translation of the wheel 24 and the ram 20 tends to distribute wear in the area of the apertures 28 and 44, commonly embodied as hereinafter described by expensive alloy steel tooling, around the surfaces of the apertures in a relatively uniform way thereby to substantially improve tooling life relative to the unidirectional drive which was used in the prior art device described above.

The stationary ram 18 lies between and immediately adjacent each of the frame 92 and the orbital ram 20 and is provided with a tool steel insert 46 having formed therein the aperture 44 which closely surrounds and holds the tubular stock 14 during the shearing operation. To permit alignment of the apparatus as hereinbefore described and to accommodate tubular stock of varying outside diameter, the stationary ram 18 is also mounted on the bolt 92 for pivotal motion about the axis 52 which is the common pivot axis to the frame 92 and the fixed ram 18. A support leg 104 is mounted on the stationary ram 18 and extends in adjustable threaded relationship into the base 12. A compression spring 106 urges the right side of the ram 18 in the counter-clockwise direction as shown in FIG. 3 to maintain tension in the bolt 104. The frame 92 and the stationary ram 18 are preferably fastened together so they can be moved and/or adjusted as a unit by through bolts 108 and 110 which extend parallel to the axis of the tubular stock 14. The nuts on bolts 108 and 110 are tightened once proper alignment has been achieved.

Figure 5:
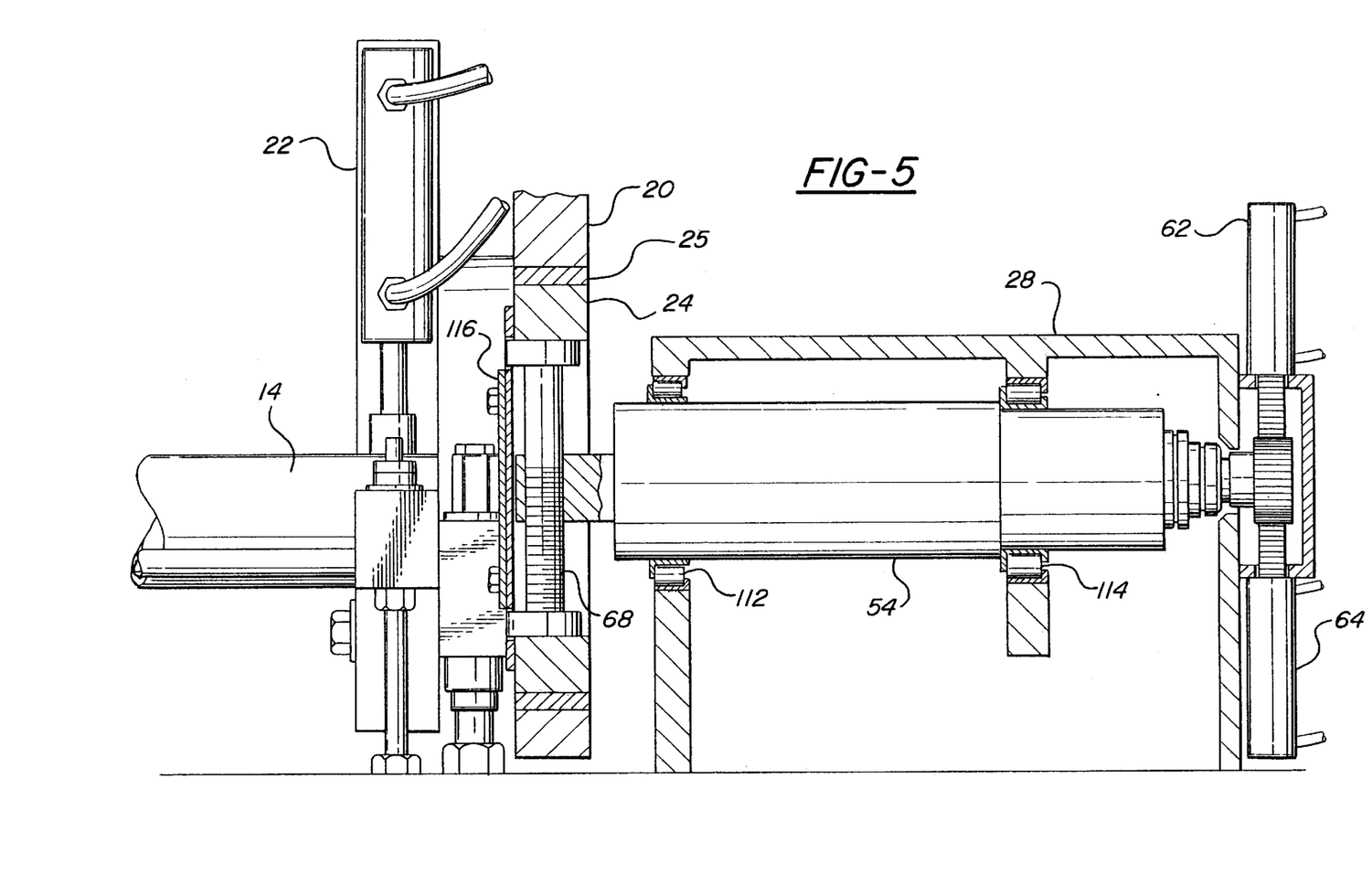
FIG. 5 is a side view partly in section to show details of the linear drive.

As best shown in FIG. 5, the transmission housing 28 contains a stepped steel shaft 54 having two different but relatively large outer diameters seated in bearings 112 and 114 for rotation about the central axis of the shaft 54. The right-hand end of the shaft 54, as shown in FIG. 5, is splined to receive the pinion 58 shown in FIG. 2 but removed for clarity in FIG. 5. Pinion 58 meshes with the racks of the two-way linear drive as hereinafter described. The left side of the shaft 54 is of polygonal configuration to define nut 66 and extends into the slot 70 in the drive wheel 24 to engage the threaded shaft 68 disposed therein. A plate 116 covers the slot 70 during operation as shown in FIG. 5.

Looking now to FIG. 6, the details of the mandrel 32 which is disposed within the tubular stock 14 during shearing operations to prevent collapse and/or deformation of the stock wall will be described. The mandrel 32 is a bullet-shaped steel body mounted on shaft 34 which permits the mandrel to extend through a long length of tubular stock and precisely located so that critical portions of the mandrel correspond in location with the shear line at the interface between the shear tooling hereinbefore described. The shaft 34 terminates in a flared end collar 112 having a threaded axial bore which receives therein the threaded end of a rod 114 to permit length adjustments. Nut 116 locks the threaded rod 114 relative to the collar 112 when the appropriate length is achieved.

The body of mandrel 32 is essentially cylindrical and its internal diameter closely approximates that of the interior of the tubular stock 14. It is long enough to lie between the dies 18 and 20 and to lie within the stock 14 under the clamp 22. The distal end of the mandrel 32 is provided with an assembly which comprises a threaded center shaft, a fixed annulus 120, a laterally moveable annulus 118, a cap 124, a compression spring 126, a cam collar 128, and a nut 122. Cam collar 128 has a beveled external bearing surface which mates with a similar beveled interval surface in annulus 120. Spring 126 permits the collar 128 to move radially and axially at the same time against the bias of spring 126. The mating plane or "seam" between fixed annulus 120 and moveable annulus 118 must correspond precisely to the interface seam between the-stationary and orbital rams 18 and 20, respectively, during a shearing operation so that one section of stock 14 can move laterally of the adjacent section for shearing purposes.

Looking now to FIG. 8 an hydraulic control system for programming and controlling operation of the linear drive will be described. Pressure (P) and Tank (T) lines 132, 134 are connected in a loop fashion through hydraulic spool valves 136, 137 and 138 each of which is equipped with a conventional internal spool to permit high pressure and tank pressure to be gradually applied to either of the output lines from those valves in a controlled and selectable fashion. Valve 136 is a proportional value and is connected via output lines 139 and 140 to the hydraulic cylinders 62 and 64 to effect displacement of the internal pistons/racks 65 and 66 respectively. These racks engage the teeth of the orbital wheel drive pinion 58 which resides in a box 130 lubricated by pressure tapped from line 139 through a regulator 141.

Figure 8:
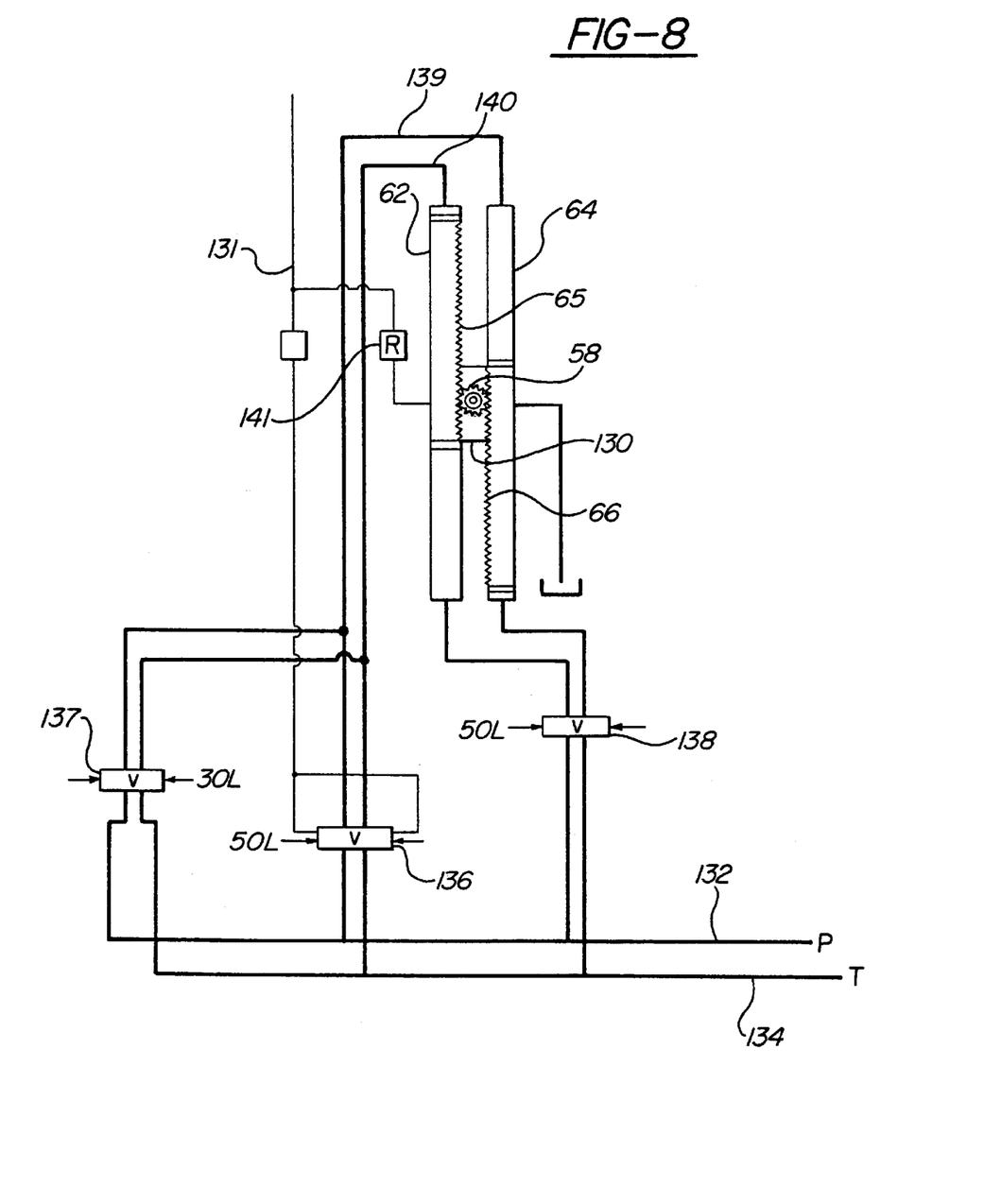
FIG. 8 is a schematic diagram of an hydraulic power system for producing operation of the linear drive.

In the configuration shown in FIG. 8 high pressure (P) will be applied to the top of cylinder 62 to initiate a shear cycle and tank pressure (T) simultaneously applied to the top of cylinder 64 to maintain a small residual pressure against the top of racks/pistons 66. As a result the high pressure drives the racks/pistons 65 downwardly as shown in FIG. 8 rotating the pinion 58 counter clockwise and driving the right hand piston 66 through the pinion 58 upwardly against the slight residual tank pressure. This maintains the teeth of the pinion gears in engagement with the same side of the rack convolutions at all times and eliminates backlash which might otherwise make stopping the orbital wheel at the dead center position more difficult and/or impossible. To drive the piston/racks 65, 66 in the opposite direction the spool in valve 136 is shifted by an appropriate input signal to a position which reverses the pressure value on the output line. The cylinders 62 and 64 are provided with precisely adjustable mechanical stops which correspond to and actually define the top-dead-center position.

Valve 137 is used to selectively "jog" the pistons for any of a variety of operations including test and die assembly procedures. Valve 138 is available to provide a torque boost in the event a particularly hard or heavy wall thickness material is to be shorn.

It will be apparent to those skilled in the hydraulic control arts that the valves 137 and 138 are controlled by solenoids which in turn are controlled from a conventional control panel having push buttons, switches, and similar input/output devices. Valve 136 is preferably controlled by hydraulic pressure through a pilot line 131.

An arrangement using a single hydraulic cylinder is, of course, a possibility and is the equivalent of the two-cylinder arrangement shown. I prefer to use two cylinders since this assures me of equal power in both directions. In operation, a first shearing stroke is initiated by opening valve 136 to actuate cylinders 62 and 64 in the manner described above. This rotates the pinion 58 one revolution of the drive wheel 24. On the next cycle, the cylinders 62 and 64 are actuated in the opposite direction by opening valve 136 to apply "P" and "T" pressures to opposite cylinders.

A suitable apparatus for implementing the linear drive including the hydraulic cylinders, the racks, and the pinion, as well as the high pressure hydraulic pump 132 and its power supply is available from FLO-TORK, Inc. of Orrville, Ohio 44667. FLO-TORK, Inc. refers to the product as an hydraulic rotary actuator.

Figures 9A, 9B, 9C, 9D:
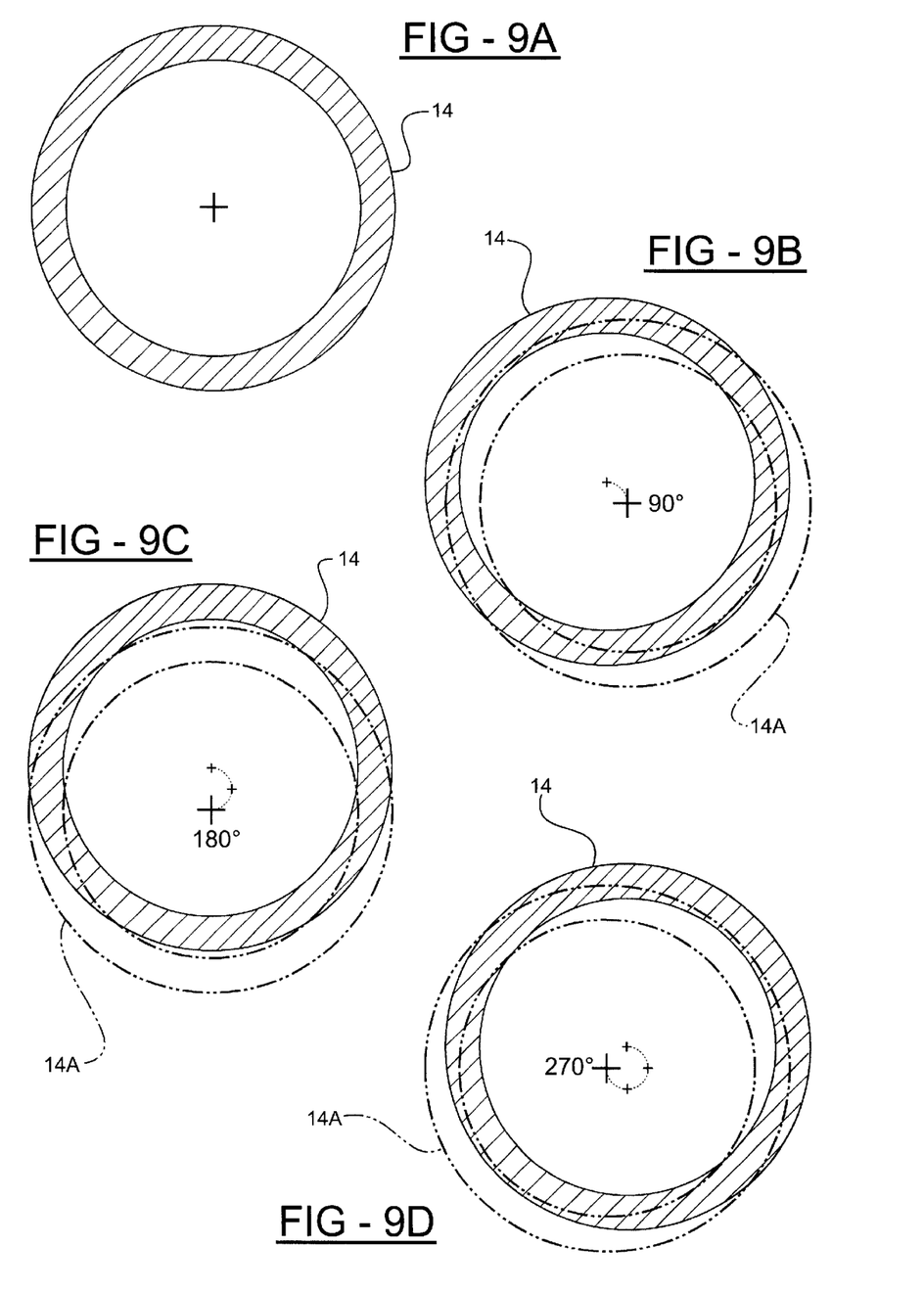
FIGS. 9A–9D is a four-part diagram showing the movement of the workpiece during a two stroke shearing method.

FIG. 9 illustrates a further method for shearing tubular stock in such a way as to optimize the quality of the newly formed tube ends at the parting plane of each shearing operation. In general this is achieved by adjusting the stroke length until it is only slightly greater than the wall thickness of the tubular workpiece 14 and thereafter moving the moveable die from a home position through only approximately 200 degrees to 270 degrees, stopping the die and reversing it back to the home position. The term "home position" refers to the position of the tooling when the geometric centers of die apertures 38 and 44 are co-located as shown in FIG. 9A.

By way of example, tubular stock with approximately a 3" diameter and a 0.056" wall thickness is preferably cut using a maximum stroke of 0.087" and a two-direction, orbital stroke of about 270 degrees in each direction. FIG. 9A shows the end of the stock 14 before it is cut; i.e., the home position. As a practical matter the first 10 degrees to 25 degrees of travel simply take up clearances in the system. Thereafter the material of the tubular stock 14A held by the moveable tooling 42 begins shift relative to the material 14 in the adjacent portion of the tube held by the fixed tooling 18. FIG. 9B shows the relative movement of the moveable portion of the stock after 90 degrees of movement along an orbital path which, in this example is circular. FIG. 9C shows the material of the tube 14 after the orbital tool 42 has moved through 180 degrees of the orbital path. FIG. 9D shows the stock ends after 270 degrees of orbital travel. At this point, tool 42 is stopped and reversed back to the home position of FIG. 9A to complete the shearing operation.

By way of summary, the die 42 can be displaced through full 360, degrees orbits in alternate directions to shear tubular stock 14 with each movement or, alternatively, displaced through only partial orbits in which case two movements in opposite directions are needed to shear the stock. The latter approach is preferably used in connection with a minimum stroke thereby to improve the quality of the newly formed tube ends.

What is claimed is:

1. A method for shearing tubular stock using a bladeless supported shear of the type having fixed tooling for receiving the stock, adjacent orbitally moveable tooling for receiving the stock and a mandrel for disposition within the tooling when in the area of the fixed and moveable tooling, the method comprising the steps of:
   a. driving the moveable tooling from a home position through an incomplete orbital path comprising between about 200 degrees and 270 degrees of a full orbital path, and, thereafter,
   b. driving the orbital tooling in the reverse direction back to the home position.

2. A method of shearing tubular stock having a known wall thickness using a device having a fixed tool having a center, an adjacent, orbitally moveable tool having a center and a mechanism for adjusting the amount of displacement between the centers of the fixed and orbitally moveable tools during a shearing operation comprising the steps of:
   a. adjusting the device so that the aforesaid tooling center displacement is only marginally greater than the wall thickness of the stock;
   b. driving the moveable tooling in one direction from an original position through no more than about 270 degrees of orbital travel; and, thereafter,
   c. driving the orbital tooling in the reverse direction back to its original position.

3. A supported shearing apparatus comprising:
   a. a fixed tool for receiving a tubular workpiece,
   b. a moveable tool immediately adjacent the fixed tool for receiving a tubular workpiece;
   c. means for collocating the center lines of the fixed and moveable tools to define a home position and for varying the degree of displacement between the fixed and moveable centers during an orbital movement of the moveable tool;
   d. a first hydraulic power source for driving the moveable tool in one direction; and
   e. a second hydraulic power source for moving the moveable tool in the opposite direction.

* * * * *